United States Patent [19]

Gruffaz et al.

[11] 4,010,220

[45] Mar. 1, 1977

[54] CURABLE COMPOSITIONS BASED ON IMIDE GROUP-CONTAINING COMPOUNDS

[75] Inventors: Max Gruffaz, La Mulatiere; Jean-Louis Locatelli, Vienna, both of France

[73] Assignee: Rhone-Poulenc Industries, Paris, France

[22] Filed: Feb. 18, 1975

[21] Appl. No.: 550,733

[30] Foreign Application Priority Data

Feb. 20, 1974 France .................................. 74.05717

[52] U.S. Cl. .......................... 260/858; 260/77.5 R; 260/77.5 A; 260/857 PA; 428/425
[51] Int. Cl.² ................... C08G 18/22; C08L 75/00
[58] Field of Search ....... 260/857 PA, 858, 77.5 R, 260/77.5 A, 75 TN, 75 NH, 77.5 AM

[56] References Cited

UNITED STATES PATENTS

| | | | |
|---|---|---|---|
| 3,652,471 | 3/1972 | Sattler | 260/858 |
| 3,712,933 | 1/1973 | Ducloux et al. | 260/857 PA |
| 3,737,432 | 6/1973 | George et al. | 260/858 |
| 3,817,926 | 6/1974 | Pauze et al. | 260/77.5 R |
| 3,886,228 | 5/1975 | Bolger | 260/77.5 R |

*Primary Examiner*—H.S. Cockeram
*Attorney, Agent, or Firm*—Stevens, Davis, Miller & Mosher

[57] ABSTRACT

Curable compositions are provided based on an imide group-containing compound, an amino compound and a polyurethane elastomer in specified proportions. These compositions can be cured to give articles possessing excellent impact strength.

9 Claims, No Drawings

CURABLE COMPOSITIONS BASED ON IMIDE GROUP-CONTAINING COMPOUNDS

THIS INVENTION relates to curable compositions based on compounds possessing imide groups.

The compositions of the present invention are characterized in that they comprise: A. an imide-group containing compound chosen from
  a. a bis-imide of the formula

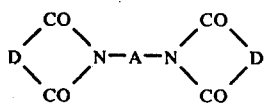
(I)

in which the symbol D represents a divalent radical chosen from radicals of the formulae

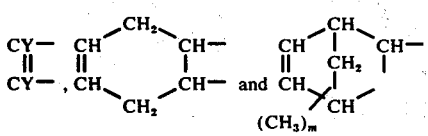

wherein Y represents H, $CH_3$ or Cl and $m$ is equal to 0 or 1, and the symbol A represents a divalent organic radical containing 2 to 30 carbon atoms, and
  b. a mixture comprising a bis-imide of formula (I) and a mono-imide of the formula

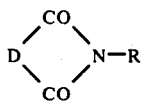
(II)

in which the symbol D is as defined above and the symbol R represents a hydrogen atom or a monovalent organic radical containing 1 to 20 carbon atoms.

B. an amino compound chosen from
  a. one or more polyamines containing 2 to 5 primary or secondary amino groups, at least one of which is primary, and
  b. a mixture comprising one or more polyamines as defined under a) and one or more primary and/or secondary monoamines and/or one or more secondary polyamines, and C. a polyurethane elastomer, the amounts of (A), (B) and (C) being such that: firstly, the weight ratio $$\frac{\text{polyurethane }(C)}{\text{compound possessing imide groups }(A) + \text{amine compound }(B)}$$

is from 1/25 to 5/1, and, secondly, the ratio $$\frac{\text{number of double bonds in the compound }(A)}{\text{number of }-NH_2\text{ groups in the amine-type compound }(B)} \text{ is from}$$

is from 0.6/1 to 50/1.

In formula (I), the symbol A can represent, for example, a linear alkylene radical with less than 13 carbon atoms, a phenylene radical, a cyclohexylene radical, or a radical of formula:

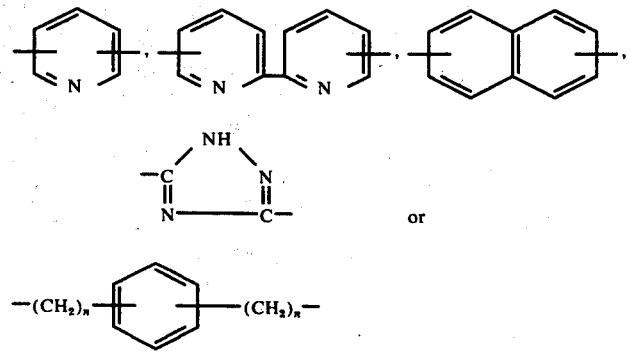

wherein $n$ represents an integer from 1 to 3. The symbol A can also comprise several alkylene radicals bonded to one another by an atom or group such as $-O-$, $-NR_1-$, or several phenylene or cyclohexylene radicals bonded to one another by a single valency bond or by an inert atom or group such as $-O-$, $-S-$, an alkylene group with 1 to 3 carbon atoms, $-CO-$, $-SO_2-$, $-NR_1-$, $-N=N-$, $-CONH-$, $-COO-$, $-P(O)R_1-$, $-CONH-X-NHCO-$,

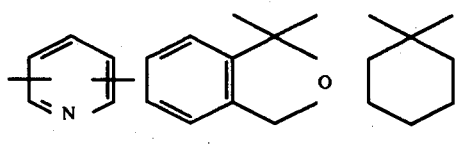

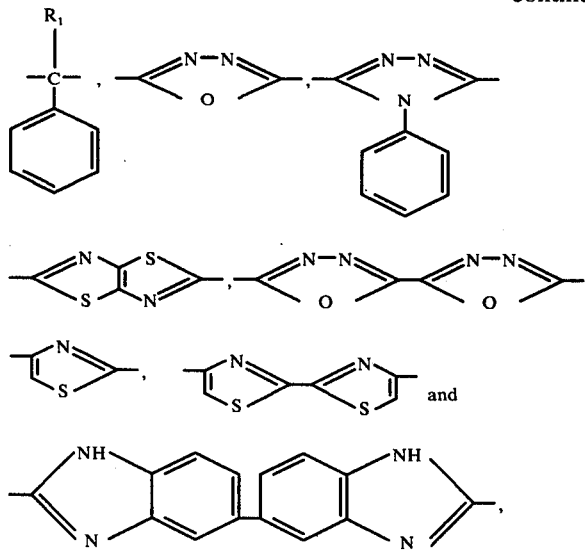

wherein $R_1$ represents a hydrogen atom, an alkyl radical with 1 to 4 carbon atoms, a phenyl radical or a cyclohexyl radical, and X represents an alkylene radical with less than 13 carbon atoms.

The various phenylene or cyclohexylene radicals can be substituted by groups such as —$CH_3$ and —$OCH_3$ or by a chlorine atom.

Specific examples of bis-imides include: N,N'-ethylene-bis-maleimide, N,N'-hexamethylene-bis-maleimide N,N'-meta-phenylene-bis-maleimide, N,N'-para-phenylene-bis-maleimide, N,N'-4,4'-diphenylene-bis-maleimide, N,N'-4,4'-diphenylmethane-bis-maleimide, N,N'-4,4'-diphenylmethane-bis-tetra-hydrophthalamide, N,N'-4,4'-(diphenyl ether)-bis-maleimide, N,N'-4,4'-(diphenyl sulphide)-bis-maleimide, N,N'-4,4'-diphenylsulphone-bis-maleimide, N,N'-4,4'-dicyclohexylmethane-bis-maleimide, N,N'-α,α'-dimethylene-cyclohexane-bis-maleimide, N,N'-meta-xylylene-bis-maleimide, N,N'-para-xylylene-bis-maleimide, N,N'-4,4'-(1,1-diphenyl-cyclohexane)-bis-maleimide, N,N'-4,4'-diphenylmethane-bis-citraconimide, N,N'-4,4'-(diphenyl ether)-bis-endomethylenetetrahydrophthalimide, N,N'-4,4'-diphenylmethane-bis-chloromaleimide, N,N'-4,4'-(1,1-diphenyl-propane)-bis-maleimide, N,N'-4,4'-(1,1,1-triphenyl-ethane)-bis-maleimide, N,N'-4,4'-triphenylmethane-bis-maleimide, N,N'-3,5-(1,2,4-triazole)-bis-maleimide, N,N'-dodecamethylene-bis-maleimide, N,N'-(2,2,4-trimethyl-hexamethylene)-bis-maleimide, 1,2-bis-(2-maleimido-ethoxy)-ethane, 1,3-bis-(3-maleimidopropoxy)-propane, N,N'-4,4'-benzophenone-bis-maleimide, N,N'-pyridine-2,6-diyl-bis-maleimide, N,N'-1,5-naphthylene-bis-maleimide, N,N'-1,4-cyclohexylene-bis-maleimide, N,N'-5-methyl-1,3-phenylene-bis-maleimide and N,N'-5-methoxy-1,3-phenylene-bis-maleimide.

These bis-imides can be prepared by applying the methods described in, for example, U.S. Pat. No. 3,018,290 and British Patent Specification No. 1,137,592.

In formula (II), the symbol R can represent, for example, a linear or branched alkyl or alkenyl radical with up to 20 carbon atoms, a cycloalkyl radical containing 5 or 6 carbon atoms in the ring, a mono- or bi-cyclic aryl, alkylaryl or aralkyl radical containing up to 20 carbon atoms, one of the radicals

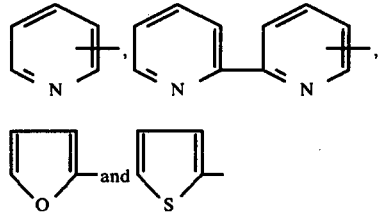

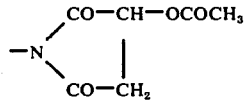

or a monovalent radical consisting of a phenyl radical and a phenylene radical bonded to one another by a single valency bond or by an inert atom or group such as —O—, —S—, an alkylene radical with 1 to 3 carbon atoms, —CO—, —$SO_2$—, —$NR_1$—, —N=N—, —CONH— and —COO—, wherein $R_1$ is as defined above. Moreover, these various radicals can be substituted by one or more atoms, radicals or groups such as —F, —Cl, —$CH_3$, —$OCH_3$, —$OC_2H_5$, —OH, —$NO_2$, —COOH, —$NHCOCH_3$ and $$-N\begin{matrix}CO-CH-OCOCH_3\\ |\\ CO-CH_2\end{matrix}$$

Specific examples of mono-imides include: maleimide, N-phenylmaleimide, N-phenylmethylmaleimide, N-phenylchloromaleimide, N-p-chlorophenyl-maleimide, N-p-methoxyphenylmaleimide, N-p-methylphenylmaleimide, N-p-nitrophenylmaleimide, N-p-phenoxyphenylmaleimide, N-p-phenylaminophenylmaleimide, N-p-phenoxycarbonylphenylmaleimide, N-p-phenylcarbonylphenylmaleimide, 1-maleimido-4-acetoxysuccinimido-benzene, 4-maleimido-4'-acetoxysuccinimido-diphenylmethane, 4-maleimido-4'-acetoxysuccinimido-diphenyl ether, 4-maleimido-4'-acetamido-diphenyl ether, 2-maleimido-6-acetamido-pyridine, 4-maleimido-4'-acetamido-diphenylmethane, N-methylmaleimide, N-ethylmaleimide, N-vinylmaleimide, N-allylmaleimide, N-cyclohexylmaleimide and

N-decylmaleimide. It will, of course, be appreciated that in a given composition the radical D in the bis-imide need not be the same as the radical D in the mono-imide.

These mono-imides can be prepared applying the methods described in, for example U.S. Pat. Nos. 2,444,536 and 3,717,615 or in German Patent Application (DOS) 2,354,654.

When a mixture of a bis-imide of formula (I) and a mono-imide of formula (II) is used, the number of imide groups supplied by the mono-imide can generally represent up to 30% of the total number of imide groups supplied by the mixture.

The amino compound (B) is, in particular, a polyamine (1) of the formula $$H_2N - E - NH_2 \qquad (III)$$

in which the symbol E can represent one of the radicals represented by the symbol A in formula (I). Examples of such compounds containing two primary amino groups include bis-(4-amino-cyclohexyl)-methane, 2,2-bis(4-amino-cyclohexyl)-propane, 1,4-diamino-cyclohexane, 2,6-diamino-pyridine, meta-phenylene-diamine, paraphenylene-diamine, bis-(4-amino-phenyl)-methane, 2,2-bis-(4-amino-phenyl)-propane, benzidine, 4,4'-diamino-phenylether, 4,4'-diamino-phenyl sulphide, 4,4'-diamino-diphenylsulphone, bis-(4-amino-phenyl)-methylphosphine oxide, bis-(4-amino-phenyl)-phenylphosphine oxide, N,N'-bis-(4-aminophenyl)-methylamine, 1,5-diamino-naphthalene, meta-xylylenediamine, para-xylylene-diamine, 1,1-bis-(para-aminophenyl)-phthalane, α,ω-polymethylene-diamines such as hexamethylenediamine, octamethylene-diamine, decamethylene-diamine and 2,5-dimethyl-heptamethylene-diamine, polyether-diamines of the formula $H_2N(CH_2)_tO(CH_2CH_2O)_uNH_2$ in which $t$ and $u$ are integers from 1 to 10 such as the diamine of the formula $H_2N(CH_2)_3O(CH_2)_2O(CH_2)_3NH_2$, bis-(hexamethylene)-triamine, diethylene-triamine, tetraethylene-pentamine, 7,8-diamino-p-menthane, 6,6'-diamino-2,2'-dipyridyl, 4,4'-diamino-benzophenone, 4,4'-diamino-azobenzene, bis-(4-amino-phenyl)-phenylmethane, 1,1-bis-(4-amino-phenyl)-cyclohexane, 1,1-bis-(4-amino-3-methyl-phenyl)-cyclohexane, 2,5-bis-(m-aminophenyl)-1,3,4-oxadiazole, 2,5-bis-(p-aminophenyl)-1,3,4-oxadiazole, 2,5-bis-(m-amino-phenyl)-thiazolo-(4,5-d)thiazole, 5,5'-di-(m-amino-phenyl)-2,2'-bis(1,3,4-oxadiazolyl),4,4'-bis-(p-amino-phenyl)-2,2'-dithiazole, m-bis-[4-(p-aminophenyl)-thiazol-2-yl]-benzene, 2,2'-bis-(m-aminophenyl)-5,5'-dibenzimidazole, 4,4'-diamino-benzanilide, 4,4'-diamino-phenyl-benzoate, 4,4'-N,N'-bis-(p-aminobenzoyl)-diamino]-diphenylmethane, bis-p-(4-amino-phenoxycarbonyl)-benzene, bis-p-(4-amino-phenoxy)-benzene, 3,5-diamino-1,2,4-triazole, 1,1-bis-(4-amino-phenyl)-1-phenyl-ethane and 3,5-bis-(4-amino-phenyl)-pyridine.

The amino compound can also be a polyamine (2) containing 3 to 5 —NH₂ groups per molecule and possessing up to 50 carbon atoms. In these polyamines, the -NH₂ groups can be carried by, for example, a benzene nucleus, optionally substituted by methyl groups, or a naphthalene, pyridine or triazine nucleus; they can also be carried by several benzene nuclei bonded to one another by a single valency bond or by an inert atom or group such as defined under A, or

Examples of such polyamines include 1,2,4-triamino-benzene, 1,3,5-triamino-benzene, 2,4,6-triamino-toluene, 2,4,6-triamino-1,3,5-trimethyl-benzene, 1,3,7-triamino-naphthalene, 2,4,4'-triamino-diphenyl, 2,4,6-triamino-pyridine, 2,4,4'-triaminodiphenyl ether, 2,4,4'-triamino-diphenylmethane, 2,4,4'-triamino-diphenylsulphone, 2,4,4'-triaminobenzophenone, 2,4,4'-triamino-3-methyl-diphenylmethane, N,N,N-tris-(4-amino-phenyl)-amine, tris-(4-amino-phenyl)-methane, 4,4',4''-triamino-phenyl orthophosphate, tris(4-amino-phenyl)-phosphine oxide, 3,5,4'-triaminobenzanilide, melamine, 3,5,3',5'-tetraamino-benzophenone, 1,2,4,5-tetraamino-benzene, 2,3,6,7-tetraamino-naphthalene, 3,3'-diamino-benzidine, 3,3',4,4'-tetraamino-phenyl ether, 3,3',4,4'-tetraamino-diphenylmethane, 3,3',4,4'-tetraaminodiphenylsulphone, 3,5-bis-(3,4-diamino-phenyl)-pyridine, and oligomers of the average formula:

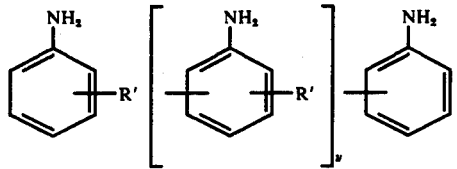

wherein $y$ represents a number ranging approximately from 0.1 to 2, the symbol R' denoting a divalent hydrocarbon radical which possesses 1 to 8 carbon atoms and which is derived from an aldehyde or a ketone of the general formula:

$$O = R'$$

in which the oxygen atom is bonded to a carbon atom of the radical R'; typical such aldehydes and ketones are formaldehyde, acetaldehyde, oenanthal, benzaldehyde, acetone, methyl ethyl ketone, 2-hexanone, cyclohexanone and acetophenone. These oligomers possessing amino groups can be prepared in accordance with known processes, such as those described in French Pat. Nos. 1,430,977, 1,481,935 and 1,533,696. The crude mixtures of polyamines obtained according to these processes can be enriched in one or more constituents, for example by distillation under reduced pressure.

The amino compound can also be a polyamine (3) possessing up to 50 carbon atoms and containing a primary amine group and one or more secondary amine groups. Examples of such polyamines include (4-methylamino-phenyl)-(4'-amino-phenyl)-methane, (4-methyl-amino-phenyl) (4'-amino-phenyl) ether, (4-methylamino-phenyl)-(4'-amino-phenyl-sulphone, 1-methylamino-4-amino-benzene, 2-methylamino-4-amino-toluene, 2-methylamino-5-aminoanisole, 3-methylamino-propylamine, N-(4-amino-benzoyl)methylamine, 2-ethoxy-4-methylamino-aniline, 3'-methylamino-4-benzoylamino-aniline, 3-ethylaminoethoxy-propylamine, 3-ethylaminoethyl-mercaptopropylamine, 6-methylaminohexylamine, (4-methylamino-cyclohexyl)-(4'-amino-cyclohexyl)methane, 2-phenylamino-ethylamine, 2-α-pyridylaminoethylamine, 2-p-methylaminophenyl-5amino-1,3,4-oxadiazole, 2-m-methylaminophenyl-5-amino-benzoxazole, N-(p-aminobenzoyl)-piperazine, 3,5-bis-(methylamino)-4'-aminobenzanilide and [2,4-bis-(methylamino)-phenyl] (4'-aminophenyl) ether.

It is to be understood that it is possible to use one or more amino compound which is a polyamine of type (1), (2) or (3), or to use a mixture of compounds belonging to two or three of these types.

It is also possible to use a mixture comprising one or more polyamines of type (1), (2) and/or (3), and one or more other amino compounds containing one primary or secondary amino group, or containing several amino groups, none of which is primary.

Examples of suitable primary or secondary monoamines include methylamine, ethylamine, butylamine, octylamine, cyclohexylamine, cyclohexyl-methylamine, aniline, o-chloroaniline, p-anisidine, α-naphthylamine, benzylamine, 2-phenyl-ethylamine, 2-amino-pyridine, 3-amino-furane, 2-amino-pyrimidine, 5-amino-benzoxazole, 5-amino-benzothiazole, ethanolamine, hexylamine, nonylamine, lauryl-amine, stearyl-amine, 3-butoxy-propylamine, 3-diethylamino-propylamine, o-toluidine, o-anisidine, o-aminophenol, phenyl p-aminophenyl ether, m-aminobenzophenone, m-aminobenzanilide, p-diphenylaminoaniline, dibutylamine, diethanolamine, methyl-ethylamine, monomethylaniline, piperidine, morpholine, monomethylaminocyclohexane, monomethylaminophthalene, diphenyl and N-α-or -β-naphthylanilines and (phenyl)-(4-amino-phenyl)-sulphone.

When the amino compound comprises a monoamine or a secondary polyamine, the proportion of the latter in the mixture is preferably such that the number of amino groups provided by said amine represents at most 30% of the total number of amino groups of the amino compound (B).

Examples of suitable secondary polyamines, which can also possess tertiary amine groups, include bis-(4-methylamino-phenyl)-methane, bis-(4-methylamino-phenyl) ether, 2,2-bis-(4-methylamino-phenyl)-propane, bis-(3-methyl-amino-phenyl)-sulphone, 1,3-bis-(methylamino)-benzene, 1,4-bis-(phenylamino)-benzene, 1,4-bis-(β-naphthylamino)-benzene, bis-(4-methylamino-cyclohexyl)-methane, N,N'-diethylhexamethylene-diamine, 2,5-bis-(methylamino)-1,3,4-oxadiazole, piperazine, 1,2-bis-(3-methylamino-propoxy)-ethane, N-(4-methylamino-phenyl)-piperazine, tris-(4-methylamino-phenyl)-amine, tris-(4-ethylamino-phenyl)-phosphine, 3,5,4'-tris-(methylamino)-benzanilide and 3,3',5,5'-tetrakis-(methylamino)-benzophenone.

Advantageously, the relative amounts of compounds (A) and (B) are such that the ratio $$\frac{\text{number of double bonds of the compound }(A)}{\text{number of }-NH_2 \text{ groups of the compound }(B)}$$

is from 0.8 to 10, especially from 1 to 5.

The polyurethanes used as constituent (C) in the compositions according to this invention are suitably polymers formed by reacting excess of a diisocyanate with a polymer terminated by hydroxyl groups, and then reacting the macro-diisocyanate thus formed with a coupling agent.

The hydroxylic polymer can be a linear polyester, which is preferred, or a polyether.

When a polyester-urethane is used, the starting polyester preferably has a molecular weight from 1,000 to 12,000. This α,ω-dihydroxylic polyester can be prepared from a dicarboxylic acid and a diol, using an amount of reagents such that the ratio OH/COOH is greater than 1, preferably from 1.1 to 2.

Examples of suitable dicarboxylic acids include aliphatic acids such as succinic, glutaric, adipic, pimpelic, suberic, azelaic, sebacic, maleic, fumaric, methyliminodiacetic and 3-dimethylamino-hexanedioic acids, cycloalkane-dicarboxylic acids such as cyclohexane-1,4-dicarboxylic and 3-dimethylamino-cyclopentane 1,2-dicarboxylic acids, and aromatic diacids such as phthalic acids, naphthalene-1,5-dicarboxylic acid and pyrimidine- or imidazole-dicarboxylic acids.

Examples of suitable diols include ethane-1,2-diol, propane-1,2- and 1,3-diols, butane-1,2-, -2,3-, -1,3- and -1,4-diols, pentane-1,5-diol, hexane-1,6-diol, decane-1,10-diol, 2,2-dimethyl-propane-1,3-diol, 2,2-diethyl-propane-1,3-diol, butanediol, butynediol and ethyldiethanolamine, α,ω-Dihydroxylic polyethers such as the poly-(oxyalkylene) glycols mentioned below as illustrating suitable polyethers can also be used as diols.

it is of course possible to prepare the hydroxylic polyester from a mixture of diacids and/or from a mixture of diols. It is also possible to use a mixture of a diol and a polyol containing 3 to 8 OH groups per molecule, said polyol generally providing up to 10% of the total number of —OH groups. This polyol can be, for example, trimethylolpropane, pentaerythritol, sucrose or sorbitol.

The diacid/diol condensation can be carried out as described in, for example, "Polyesters" KORSHAK and VINOGRADOVA (Pergamon Press — 1965).

The α,ω-dihydroxylic polyether can be a poly-(oxyalkylene) glycol such as a poly-(oxyethylene) glycol, poly-(oxypropylene) glycol, a copolymer comprising poly-(oxyethylene) and poly-(oxypropylene) blocks, a poly-(oxytetramethylene) glycol prepared by polymerisation of tetrahydrofurane, a poly-(oxybutylene) glycol prepared from 1,2-epoxy- and/or 2,3-epoxy-butane, and a copolymer comprising poly-(oxyethylene), poly-(oxybutylene) and, optionally, poly(oxypropylene) blocks. It is also possible to use polyethers containing nitrogen, prepared from ethylene oxide, propylene oxide and/or butylene oxide and a nitrogen-containing compound such as ethylene-diamine, benzene-sulphonamide, N-methyldiethanolamine or 2-aminoethylethanolamine. Polyethers, the molecular weight of which is from 1,000 to 12,000, are preferably used in the compositions of this invention.

It is to be understood that the polyurethane can be derived from a single hydroxylic polymer or from a mixture of several dihydroxylic polymers.

In the preparation of the intermediate macrodiisocyanate, a diisocyanate is used in an amount such that the ratio NCO/OH is greater than 1 and, preferably, from 1.1 to 6.

The diisocyanate is, in particular: 1,6-diisocyanato-hexane, 2,4-diisocyanato-toluene, 2,6-diisocyanato-toluene, 1,3- and 1,4-diisocyanato-benzene, 2,2-bis-(4-isocyanato-cyclohexyl)-propane, bis-(4-isocyanato-cyclohexyl)-methane, 1,5-diisocyanato-pentane, 1,4-diisocyanato-cyclohexane, bis-(4-isocyanato-phenyl)-methane, 2,2-bis-(4-isocyanato-phenyl)-propane, 1,5-diisocyanato-naphthalene, 3,3'-dimethyl-4,4'- diisocyanato-diphenyl or bis-(3-methyl-4-isocyanato-phenyl)-methane.

It is of course possible to use a polyurethane prepared from a single diisocyanate or from a mixture of several diisocyanates. Moreover, it is possible to use a small proportion, for example up to 10% of the total number of —NCO— groups, of a compound containing from 3 to 8 —NCO groups per molecule.

The conditions for the reaction of the diisocyanate with the hydroxylic polymer are described in, for example, "Polyurethane Chemistry and Technology" by J. H. SAUNDERS and K. C. FRISCH, part 1 — 1962.

The coupling agent is advantageously: water, hydrazine, amino-acetyl-hydrazine, a diamine or a diol. When a diol is used, this may be a diol mentioned above in connection with the preparation of the polyester. It is also possible to use a mixture containing a diol and a compound possessing 3 to 8 OH groups per molecule, such as one of those mentioned above.

When the coupling agent is a diamine, the latter can be, for example, ethylene-diamine, 1,2-diamino-propane or one of the diamines of formula (III).

The use of a coupling agent in the preparation of a polyester- and a polyether-urethane is described in, for example, SAUNDERS, et al, loc. cit. chapter VI, section IV. In general terms, the amount of coupling agent is so chosen that it reacts with all the —NCO groups of the macrodiisocyanate.

In the compositions of this invention, the amounts of the compound possessing an imide group (A), the compound (B) and the polyurethane (C) are preferably so chosen that the weight ratio C/A+B is from 1/20 to ½.

The compositions according to the present invention can be prepared by making up an intimate mixture of the imide group-containing compound, the amino compound and the polyurethane. Depending on the physical characteristics of the ingredients, this operation can consist of applying the usual techniques for mixing finely divided solids, or of making up a solution or a suspension of one of the constituents in the others which is kept in the liquid state, optionally in a solvent such as cresol, dimethylformamide, N-methylpyrrolidone, dimethylacetamide or chlorobenzene.

The mixture can then be heated for several minutes at a temperature of the order of 50° C to 180° C so as to produce a homogeneous liquid, when the initial mixture contains a solid ingredient.

In addition to the amide group-containing compound the amino compound and the polyurethane, the compositions according to the invention can also comprise, as an adjuvant, an aromatic compound (c) which possesses 2 to 4 benzene rings, does not sublime at atmospheric pressure below 250° C and has a boiling point of at least 250° C; the addition of these aromatic compounds makes it possible to extend the period during which the composition can be used in the molten state. In these aromatic compounds (c), the benzene rings can form condensed nuclei or can be bonded to one another by a valency bond or by an inert atom or group such as —O—, —CO—, —CH$_2$—,

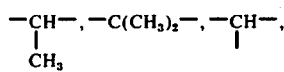

—CH$_2$—CH$_2$—,

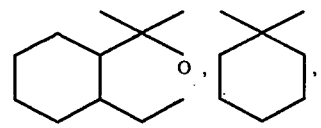

—COO—CH$_2$—, —COO—, —CO—NH—, —S—, —SO$_2$—, —NH—, —N(CH$_3$)—,

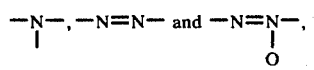

it being understood that, in one and the same compound, the rings can be connected by more than one type of linking group. The benzene rings can be substituted by inert radicals such as —CH$_3$, —OCH$_3$, —F, —Cl and —NO$_2$. Examples of compounds (c), include the terphenyl isomers, chlorinated diphenyls, phenyl ether, 2,2'-naphthyl ether, o-methoxyphenyl ether, benzophenone, 2,5,4'-trimethyl-benzophenone, p-phenylbenzophenone, p-fluorobenzophenone, azobenzene, 4,4'-dimethyl-azobenzene, azoxybenzene, diphenylmethane, 1,1-diphenyl-ethane, 1,1-diphenyl-propane, triphenylmethane, diphenylsulphone, phenyl sulphide, 1,2-diphenyl-ethane, p-diphenoxybenzene, 1,1-diphenyl-phthalane, 1,1-diphenyl-cyclohexane, phenyl benzoate, benzyl benzoate, p-nitrophenyl terephthalate and benzanilide. The compositions preferably comprise up to 10% by weight of aromatic compound (c), which can be introduced at any time during the preparation of the compositions.

When in the homogeneous liquid state, the compositions of this invention can be used directly, for example for impregnating conductors or for moulding by simple casting, preferably hot casting. It is also possible, after effecting partial curing by heating, to use these compositions in the powdered state, for example to produce compression-moulded artices, optionally in combination with fibrous or pulverulent fillers. The articles obtained possess, among other properties, a high impact strength. This property, which is also called resilience, is particularly desirable both when machining the articles and when placing them in position. It is known, in fact, that when these articles are attacked by tools rotating at high speed, such as milling cutters, grinding wheels or saws, a violent shock is created which can lead to considerable damage. Likewise, the placing of articles in position by applying force, using presses or jacks, under hot or cold conditions, creats mechanical stresses which can also cause damage. Such conditions exist, for example, when the articles are used as compressor segments or valve seats. The compositions can also be used in solution to prepare coverings, gluings and laminated materials, the substrate of which can be based on mineral, vegetable or synthetic fibres. The compositions can generally be cured by heating at temperatures of 100° to 280° C.

The following Examples further illustrate this invention.

EXAMPLE 1 a. A polyurethane elastomer is prepared by reacting one mol of a α,ω-dihydroxylic polyester with two mols of 1,6-diisocyanato-hexane and then effecting coupling with one mol of ethylene-diamine. The polyester possesses a molecular weight of 2,000 and is prepared from adipic acid and a molar excess of a mixture of 34% by weight of ethylene glycol and 66% by weight of hexane-1, 6-diol.

b. 65 g of N,N'-4,4'-diphenylmethane-bis-maleimide, 15 g of bis-(4-amino-phenyl)-methane and 10 g of the polyurethane elastomer prepared under a) are mixed intimately.

The mixture is heated for 15 minutes at 170° C.

c. The liquid composition obtained is cast in a mould (125 × 75 × 6 mm) which has already been heated to 200° C.

The whole is left at 200° C for 24 hours and is then released from the mould at 25° C. The small plate is then stoved for 24 hours at 250° C.

The impact strength (IS) (or resilience) of this small plate is measured in accordance with Standard Specification DIN 51,230, as is the flexural breaking strength (FS).

The following results are noted:

|  | Initial | | After 1,000 hours at 250° C | |
|---|---|---|---|---|
|  | at 25° C | at 250° C | at 25° C | at 250° C |
| IS (kg.cm/cm$^3$) | 31.4 | | | |
| FS (kg/mm$^2$) | 13.85 | 7.75 | 12.90 | 7.25 |

EXAMPLE 2

The experiment described in Example 1 is repeated, using 20 g (instead of 10 g) of the polyurethane elastomer.

The following results are obtained:

|  | Initial | | After 1,000 hours at 250° C | |
|---|---|---|---|---|
|  | at 25° C | at 250° C | at 25° C | at 250° C |
| IS (kg.cm/cm$^3$) | 33.6 | | | |
| FS (kg/mm$^2$) | 11.20 | 6.45 | 14.44 | 5.55 |

EXAMPLE 3 a. A polyurethane elastomer is prepared by reacting one mol of the α,ω-dihydroxylic polyester of Example 1, 4 mols of bis-(4-isocyanato-phenyl)-methane and 3 mols of butane-1,4-diol. When in the form of a 30% strength by weight solution in a mixture of dimethylformamide and methyl ethyl ketone (70/30 by volume), this polyurethane possesses a viscosity of 74 poises at 30° C.

b. 10 g of this elastomer are dissolved in 15 g of bis-(4-phenyl)-methane, heated to 150° C.

65 g of N,N'-4,4'-diphenylmethane-bis-maleimide are melted at 170° C and the solution of polyurethane in the diamine (a total of 25 g) is then incorporated into the molten bis-imide.

c. The whole is placed in a mould, as in Example 1, and is kept at 200° C for 24 hours; after release from the mould, it is stoved for 24 hours at 250° C.

The following results are noted:

|  | Initial | | After 1,000 hours at 250° C | |
|---|---|---|---|---|
|  | at 25° C | at 250° C | at 25° C | at 250° C |
| IS (kg.cm/cm$^3$) | 35.0 | | | |
| FS (kg/mm$^2$) | 13.23 | 8.25 | 11.89 | 7.65 |

EXAMPLE 4

The experiment of Example 3 is repeated, using a polyurethane elastomer which has the same composition as that of Example 3 but which possesses a viscosity of 36 poises at 30° C (as a 30% by weight solution in a mixture of dimethylformamide and methyl ethyl ketone (70/30 by volume).

The impact strength of a small plate moulded under the conditions described in Example 3 (c) is 28.0 kg.cm/cm$^3$.

EXAMPLE 5

The experiment of Example 1 is repeated, using 10 g of a polyurethane elastomer prepared from one mol of a polyethylene adipate and propylene glycol (80/20 by weight), of molecular weight approximately 1,750, 2 mols of 1,6-diisocyanato-hexane and 1 mol of ethylenediamine.

The composition is kept for 24 hours in the mould heated to 200° C (mould of Example 1) and then, after release from the mould, the article is stoved for 60 hours at 200° C.

The following results are obtained:

|  | Initial | | After 1,000 hours at 250° C | |
|---|---|---|---|---|
|  | at 25° C | at 250° C | at 25° C | at 250° C |
| IS (kg.cm/cm$^3$) | 39.7 | | 28.4 | |
| FS (kg/cm$^2$) | 16.74 | 6.40 | 14.1 | 8.35 |

EXAMPLE 6

The experiment of Example 5 is repeated, using 20 g of the polyurethane elastomer. Moulding is effected under the conditions described in Example 5.

The following results are obtained:

|  | Initial | After 1,000 hours at 250° C |
|---|---|---|
|  | at 25° C | at 25° C |
| IS (kg.cm/cm$^3$) | 40.6 | |
| FS (kg/mm$^2$) | 14.2 | 13.64 |

EXAMPLE 7

A polyurethane elastomer is prepared from the polyester of Example 5 (1 mol), 2 mols of 1,6-diisocyanato-hexane and 1 mol of bis-(4-amino-cyclohexyl)-methane.

10 g of this elastomer are mixed with 65 g of the bis-imide and 15 g of the diamine as in Example 1 (b).

Moulding is effected as under Example 1 (c), but the stoving is carried out for 72 hours at 200° C (instead of 24 hours at 250° C).

The following results are noted: IS at 25° C: 44 kg.cm/cm³, FS at 25° C: 13.92 kg/mm², at 250° C: 5.5 kg/mm².

EXAMPLE 8

The experiment of Example 1 is repeated, using 60 g of bis-imide, 22.1 g of diamine and 9 g of polyurethane elastomer.

After moulding, the small plate is stoved for 24 hours at 200° C and then for 24 hours at 250° C.

At 25° C, the impact strength is 43.75 kg.cm/cm³.

EXAMPLE 9

The experiment of Example 1 is repeated, using 8 of a polyurethane elastomer prepared from a polybutane-1, 4-diol adipate, bis-(4-isocyanate-phenyl)-methane and butane-1,4-diol.

After moulding, the small plate is stoved for 72 hours at 200° C.

The impact strength, measured at 25° C, is 38 kg. cm/cm³.

EXAMPLE 10

A polyurethane elastomer is prepared from 1 mol of a polyhexane-1,6-diol adipate and ethylene glycol (66/34 by weight), 5 mols of bis-(4-isocyanato-phenyl)-methane, 3.75 mols of butane-1,4-diol and 0.17 mol of trimethylolpropane.

Starting from 9 g of this elastomer and the same amounts of the same reagents (bis-imide and diamine) as in Example 1, a composition is prepared by following the procedure adopted in Example 1; the resulting composition is then moulded (24 hours at 200° C). After release from the mould, the article is stoved for 72 hours at 200° C.

The following results are obtained: Impact strength (at 25° C) : 30 kg.cm/cm³, Flexural strength at 25° C : 18.56 kg/mm², at 250° C : 8.25 kg/mm².

EXAMPLE 11

The experiment of Example 1 is repeated using 40 g of N,N'-4,4'-diphenylmethane-bis-maleimide, 22.2 g of bis-(4-amino-phenyl)-methane and 7 g of the polyurethane elastomer.

The impact strength of the moulded article is 34 kg.cm/cm³ (at 25° C).

EXAMPLE 12

The experiment of Example 11 is repeated, using 15 g of the polyurethane.

The impact strength (at 25° C) is 35 kg.cm/cm³.

We claim:

1. A curable composition which comprises the following three ingredients:
   A. an imide-group containing compound which is either:
      a. a bis-imide of the formula:

$$\text{D}\begin{array}{c}\text{CO}\\ \diagup\\ \diagdown\\ \text{CO}\end{array}\text{N—A—N}\begin{array}{c}\text{CO}\\ \diagup\\ \diagdown\\ \text{CO}\end{array}\text{D} \quad (I)$$

in which D represents a divalent radical of the formula:

[structural formulas]

wherein Y represents H, CH₃ or Cl and m is 0 or 1, and A represents a divalent organic radical containing 2 to 30 carbon atoms, or
   b. a mixture of a bis-imide of formula (I) and a mono-imide of the formula:

$$\text{D}\begin{array}{c}\text{CO}\\ \diagup\\ \diagdown\\ \text{CO}\end{array}\text{N—R} \quad (II)$$

in which D is as defined above and R represents a hydrogen atom or a monovalent organic radical containing 1 to 20 carbon atoms
   B. an amino compound which is either:
      a. one or more polyamines containing 2 to 5 primary or secondary amino groups, at least one of which is primary, or
      b. a mixture comprising one or more polyamines as defined under a) and one or more primary and/or secondary mono-amines and/or one or more secondary polyamines, and
   C. a polyurethane elastomer formed by reacting excess of a diisocyanate with a hydroxylic polymer and then reacting the macrodiisocyanate obtained with a coupling agent, the amounts of (A), (B) and (C) being such that: the weight ratio $$\frac{(C)}{(A)+(B)}$$

is from 1/25 to 5/1, and the ratio $$\frac{\text{number of double bonds in }(A)}{\text{number of —NH}_2\text{ groups in }(B)}$$

is from 0.6/1 to 50/1.

2. A composition according to claim 1, in which the said weight ratio is from 1/20 to 1/2.

3. The composition according to claim 1, in which the ratio $$\frac{\text{number of double bonds in }(A)}{\text{number of —NH}_2\text{ groups in }(B)}$$

is from 1/1 to 5/1.

4. A composition according to claim 1, in which the amino compound (B) is a polyamine of the formula $$\text{H}_2\text{N — E — NH}_2$$

in which E represents a divalent organic radical containing 2 to 30 carbon atoms.

5. A composition according to claim 1, in which the amino compound (B) is bis-(4-aminophenyl) methane.

6. A composition according to claim 1, in which the hydroxylic polymer from which the polyurethane is formed possesses a molecular weight from 1,000 to 12,000.

7. A composition according to claim 6, in which the hydroxylic polymer is a polyester.

8. A composition according to claim 1, in which the coupling agent employed in the formation of the polyurethane is water, hydrazine, aminoacetylhydrazine, a diamine or a diol.

9. A cured resin obtained by heating a composition as defined in claim 1 at a temperature of 100° to 280° C. for a time sufficient to cure said composition.

* * * * *